P. HANSON.
BUTTER MAKING MACHINE.
APPLICATION FILED NOV. 21, 1911.

1,084,086.

Patented Jan. 13, 1914.

P. HANSON.
BUTTER MAKING MACHINE.
APPLICATION FILED NOV. 21, 1911.

1,084,086. Patented Jan. 13, 1914.
6 SHEETS—SHEET 5.

P. HANSON.
BUTTER MAKING MACHINE.
APPLICATION FILED NOV. 21, 1911.

1,084,086.

Patented Jan. 13, 1914.

UNITED STATES PATENT OFFICE.

PAUL HANSON, OF WILD HORSE, COLORADO.

BUTTER-MAKING MACHINE.

1,084,086.

Specification of Letters Patent. Patented Jan. 13, 1914.

Application filed November 21, 1911. Serial No. 661,488.

*To all whom it may concern:*

Be it known that I, PAUL HANSON, a citizen of the United States, residing at Wild Horse, in the county of Cheyenne, in the State of Colorado, have invented certain new and useful Improvements in Butter-Making Machines, of which the following is a specification.

This invention relates to butter making machines, and more particularly to machines of this class which are adapted to be operated by mechanical power.

The principal object of the invention is to provide an improved means of the class described in which the working parts within the drum may be readily removed for cleaning, repairing, etc., and which is effective and efficient in operation.

A further object of the invention is to provide an improved machine of the class described which may be operated at different speeds while the driving shaft is being driven at the same speed.

For the attainment of these ends, and the accomplishment of other new and useful objects, as will appear, the invention consists in the features of novelty in the construction, combination and arrangement of the several parts generally shown in the accompanying drawings and described in the specification, but more particularly pointed out in the appended claims.

Referring now more particularly to the drawings, the drum 15, which may be of any desired or suitable shape, but preferably is substantially cylindrical, and is rotatably mounted upon its axis in the bearing supports 16. These bearing supports 16, together with cross pieces 17 and braces 18, are formed of any suitable material and constitute a supporting frame for the drum and the operating mechanism therefor. Preferably, and in the present exemplification of the invention, the drum is composed of wood and hoops 19 are provided to hold the sides of the drum securely in position. Extending longitudinally of the drum is an opening having a door or closure 20, with an outer surface of substantially the same curvature as the outer surface of the drum, so that when the door is locked in position the drum and the door will present a substantially cylindrical exterior. The drum 15 is formed with jamb members 21 which present a substantially plane opening for the door or closure 20. In the lower face of the door is a groove which is adapted to receive packing material 22 which constitutes an air tight construction when the door 20 is locked in place.

Figure 7:
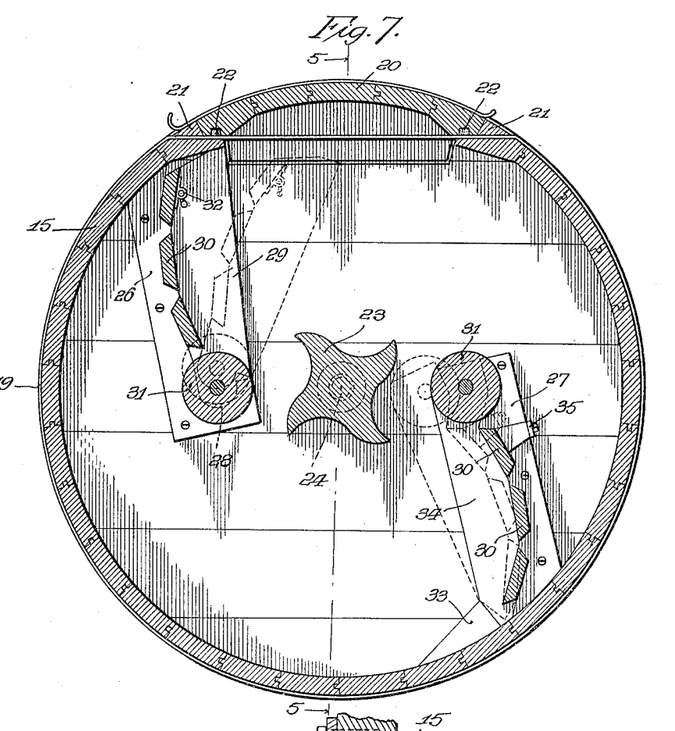
Fig. 7 is a cross sectional view through the drum.

Disposed within the drum 16 is a butter working roller 23, preferably formed with extending lips, as shown in Fig. 7. This roller is preferably mounted upon the same axis as the drum, and has a driving shaft 24 secured to it by a thumb screw 25, which extends beyond the bearing support of the drum.

Positioned within the drum and secured to the ends thereof are shelf supporting brackets 26—27. One of these brackets as 26 is disposed with one end adjacent the side of the door opening of the drum, the other end extending adjacent the center of the drum. This bracket is formed with a depression 28, at the inner end thereof to receive and retain a shelf. A shelf for this bracket 26 is formed with end pieces 29 and slats 30, extending longitudinally of the drum and spaced apart. At the inner end of the shelf and disposed between the end members 29 is a roller 31. This side of the shelf is adapted to be seated in the groove or depression 28 formed in the bracket 26, and the other side of the shelf is adapted to abut the inner surface of the drum adjacent the door opening in the drum. The shelf is locked in position by means of a catch 32, which is movable into engagement with the end of the drum. To remove the shelf from the drum it is necessary only to release the catch 32, and to rotate the shelf outwardly from its seat upon the shelf bracket 26 to take the dotted position shown in Fig. 7. The other shelf bracket 27 in the present exemplification of the invention is preferably disposed diametrically opposite to the shelf bracket 26 and substantially parallel with it. At the end of the shelf bracket 27 adjacent the shell of the drum is an abutment 33. The shelf for this bracket 27 is substantially similar to the other shelf, having end pieces 34 with slats 30 spaced apart and secured thereto, and with a roller 31 mounted there-between. One side of the shelf is positioned between the abutment 33 and the shelf bracket 27 and the other side of the shelf is secured to the bracket by means of a fastening device 35. To remove this shelf it is necessary only to loosen the fastening device 35 and to rotate the shelf until it takes the position shown in dotted outline in Fig. 7, whereby it may be removed through the opening in the drum. It will be noted that these shelves are substantially parallel and that the rollers mounted in the shelves are in a line with the butter working roller 23, the shelves being disposed substantially at right angles to the line passing through the said rollers.

Figure 6:
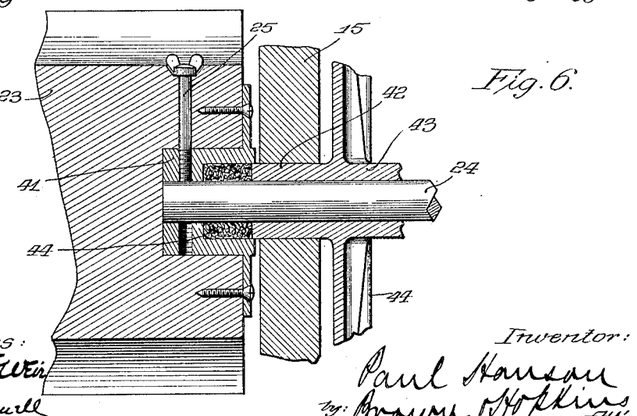
Fig. 6 is a detail sectional view of the butter working roller at its driving end, showing the packing connections.
Figure 8:
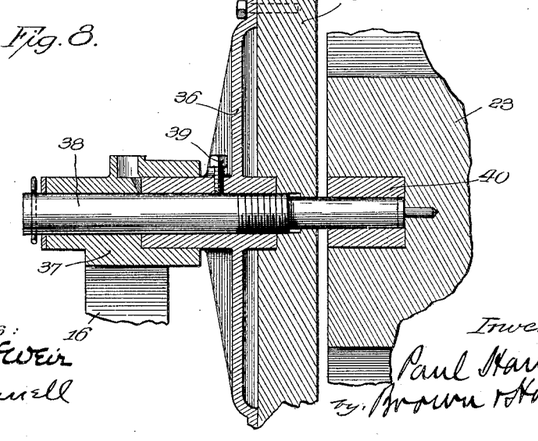
Fig. 8 is a detail sectional view of the roller at the end and the means for adjusting a longitudinal position of the roller.

Referring now more particularly to the mounting of the butter working roller 23, as shown by Figs. 6 and 8, the drum 15 is provided with a bearing member 36 secured thereto and rotatable in a bearing support 37; through the bearing member 36, and the bearing support 37, extends a shaft 38 which is preferably threaded into the member 36 and secured in any position by a lock nut 39. The inner end of this shaft 38 is reduced in cross section and extends into the end of the roller 23 where a bearing 40 is provided for it. The other end of the roller (see Fig. 6) is provided with a recessed bearing member 41, into which the shaft 24 extends, and to which the shaft and the roller are connected by means of the thumb screw 25. Extending into the recessed bearing member 41 is a sleeve portion 42 of a bearing member 43, which is secured to the outside of the drum. Disposed within the recess of the member 41, surrounding a shaft 24 and between the bearing member 41, and the sleeve 42, is packing material 44. By pressing the roller firmly against the sleeve portion 42 of the bearing member 43 the packing material is compressed, and leaking about the shaft 24 through the opening in the bearing member 43 is prevented. The position of the roller in the drum may be varied and adjusted as desired by means of the adjusting device at the other end of the roller previously described and clearly shown in Fig. 8.

Figures 4, 12:
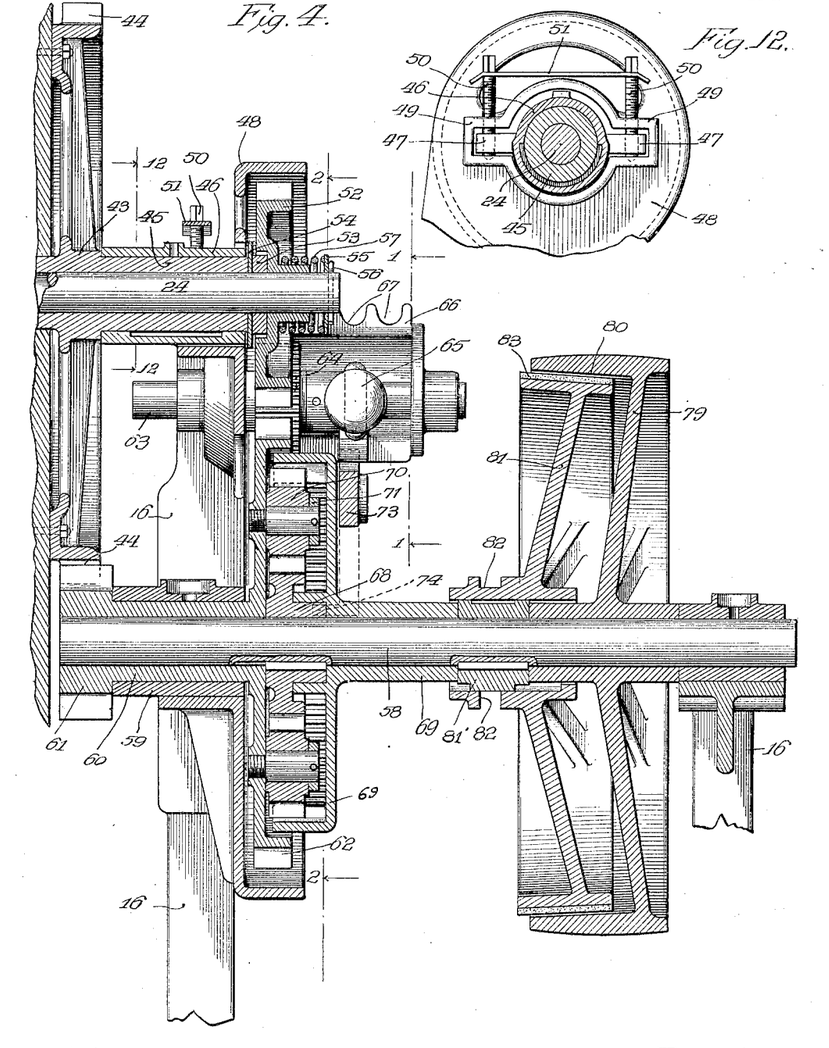
Fig. 4 is a detail sectional view of the operating gear.
Fig. 12 is a detail view partly in section on the line 12—12 of Fig. 4, showing the means for adjusting the drum bearing.
Figure 5:
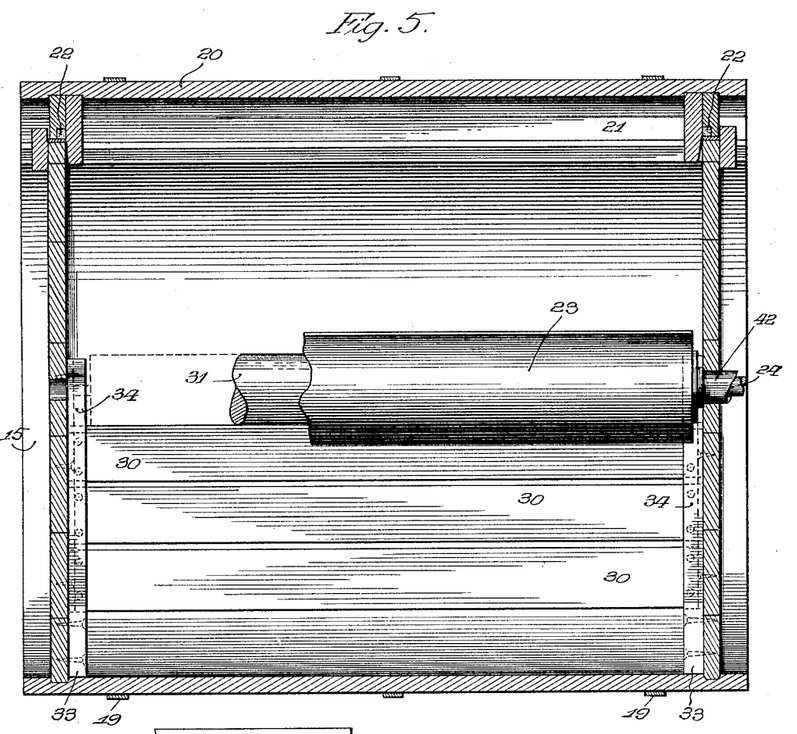
Fig. 5 is a sectional view on the vertical line 5—5 of Fig. 7 through the drum showing a section of the door, jambs, and packing, and the butter working roller and jacks on one side of the drum.

The drum 15 is rotatably mounted in the bearing supports 16 by the bearing member 36 at one end of the drum and by the bearing member 43 at the other end of the drum. The bearing member 43 is preferably secured to the drum in any suitable manner, and is provided on its outer edge with gear teeth 44. This bearing member 43 is formed with a sleeve portion 45, extending outwardly from the drum and rotatable in the bearing sleeve 46, which is supported by one of the bearing standards 16. This end bearing of the drum is preferably adjustable as shown in detail by Fig. 12. The sleeve member 46 is formed with laterally extending lugs 47 which are formed with perforations and threaded. Secured to the bearing support 16 is a shield member 48 which substantially surrounds the sleeve 46 and is formed with extending portions 49, which are adapted to receive the lateral projecting lugs 47 of the sleeve 46. The upper side of these extending portions 49 are formed with openings which register with the openings in the lugs 47, both of which are adapted to receive the bolts 50. These bolts 50 bear against the lower part of the extending portions 49, so that when the bolts are turned the sleeve 46 will be raised or lowered in accordance with the movement of the bolts. A locking bar 51 is provided which is adapted to extend over the ends of the bolts and to lock them in any adjusted position.

Rotatably mounted in the bearing member 43 and extending through the sleeve portion 45 of the bearing member is the driving shaft 24 of the butter working roller 23. This shaft extends through the sleeve portion 45 and is provided at its outer end with a gear 52, which is secured to the shaft by means of a pin 53 inserted through a slot in the shaft. Interposed between the pin 53 and the sleeve 45 is a washer 54. At the end of the shaft 24 which extends beyond the gear 52, is a washer 55, which is prevented from becoming dislodged from the shaft by means of a cotter pin 56, and interposed between the washer and the gear 52 is a spring 57, preferably of the coil spring type. This coil spring 57 presses normally against the washer 55 at the end of the shaft, and since the sleeve member 45 is positively positioned in the bearing support, the action of the spring 57 is to tend to press the shaft 24 outwardly, thereby maintaining a constant pressure upon the roller 23 in the drum, to which the shaft is attached, and being operative to draw the roller and the bearing member 41 of the roller (see Fig. 6) against the sleeve portion 42 of the bearing member 43, and thereby to compress the packing 44.

A driving shaft 58 is rotatably mounted in the bearing standards preferably by means of a bearing sleeve 59, secured to one of the bearing standards 16 adjacent one end of the shaft and in a bearing support 16 at the other end of the shaft. Surrounding and freely rotatable upon the shaft is a driving member 60, rotatable in the bearing sleeve 59. This driving member 60 is preferably formed with driving portions or gears 61 and 62. The driving portion 61 preferably meshes with the teeth 44 of the bearing member 43 secured to the end of the drum, and the other driving portion 62 is preferably disposed substantially in alinement, but not meshing with the gear 52, which is secured to the shaft 24 of the butter working roller. Longitudinally movable in the bearing frame for the drum is a shaft 63 upon which is freely mounted a pinion 64. A lever 65 is secured to the shaft 63 by means of which the pinion or gear 64 may be moved into and out of engagement with the driving gears 52 and 62. Partially surrounding the shaft 63 is a shell 66 provided with notches 67, and a lever 65 may be positioned in one or the other of these notches to hold the gear 64 in engagement with the said gears or to lock the gear 64 out of said engagement.

Figures 1, 11:
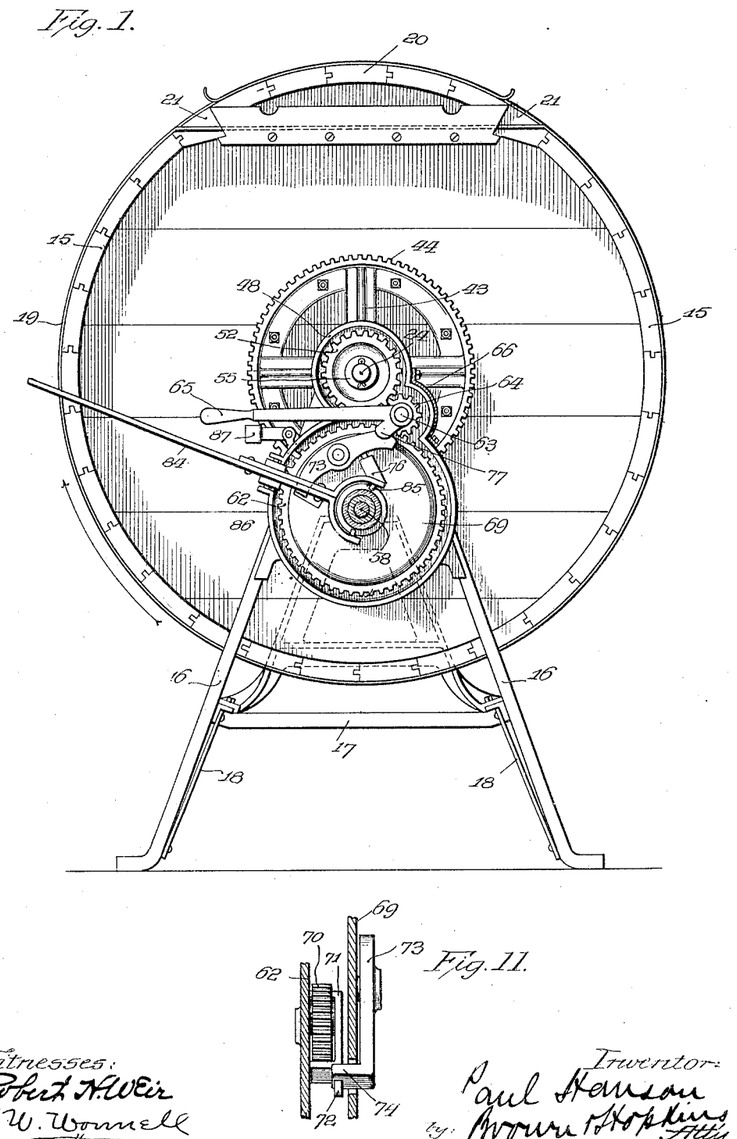
Figure 1 is an end elevation of a machine constructed in accordance with the principles of the invention and as viewed on the line 1—1 of Fig. 4.
Fig. 11 is a detail view partly in section of one of the pinions of the planetary gear, and the end of a lever in engagement with one of the lugs or housings of the planetary pinions.
Figure 2:
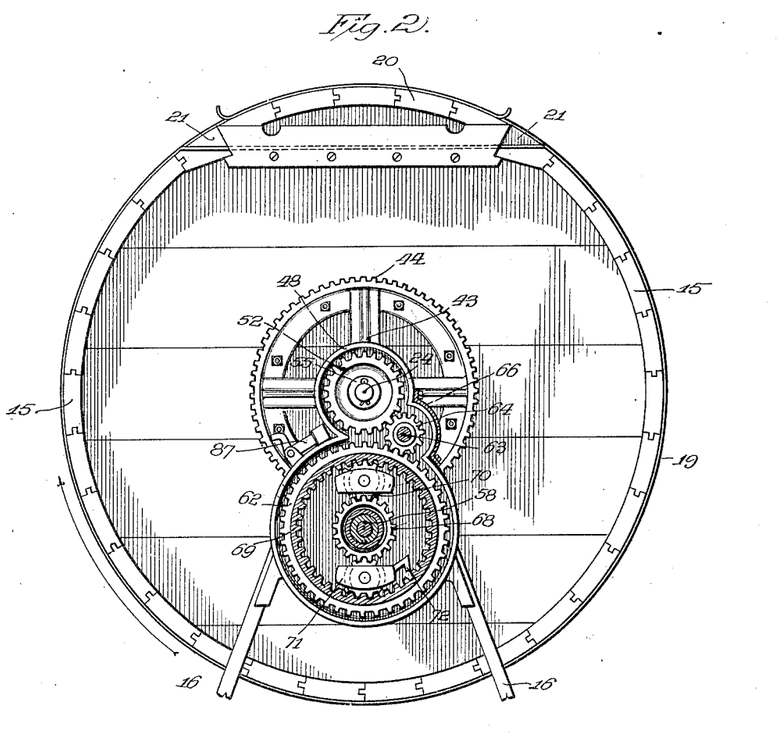
Fig. 2 is an end elevation of the drum and the operating gear as taken on the line 2—2 of Fig. 4.
Figure 3:
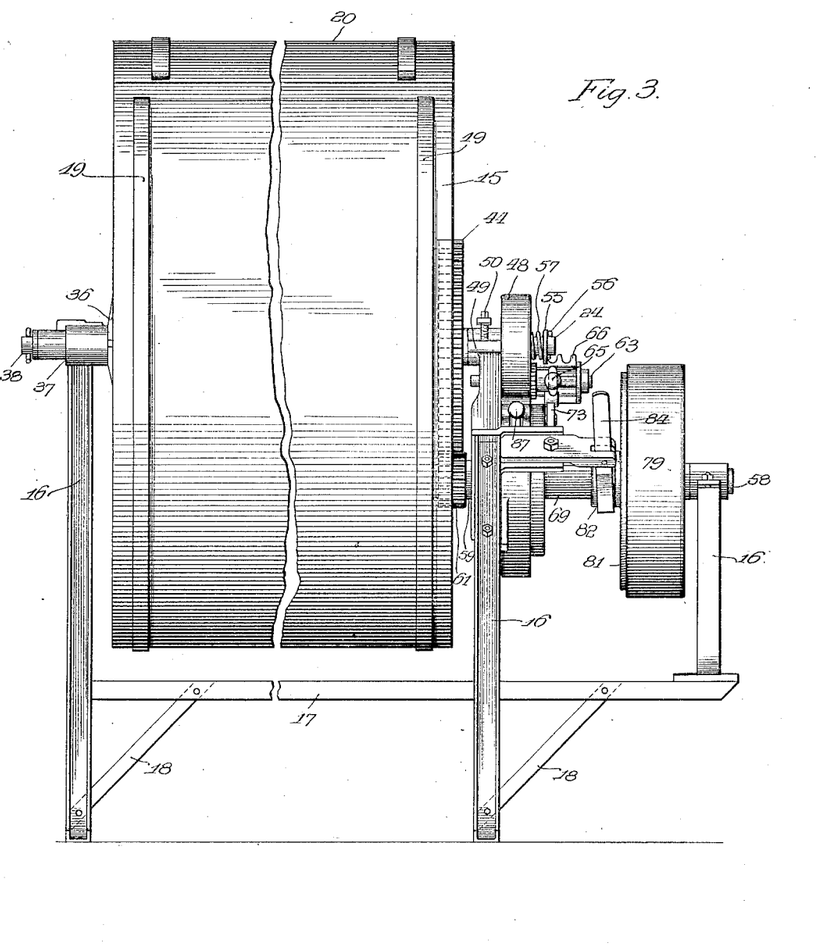
Fig. 3 is a side elevation of the machine.
Figure 9:
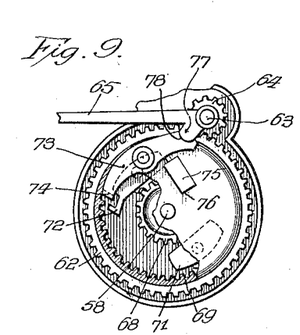
Fig. 9 is a detail view of the planetary gearing which transmits motion at reduced speed.
Figure 10:
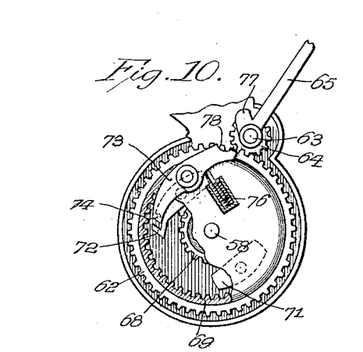
Fig. 10 is a detail view of a planetary gearing when locked solid with the shaft.

Secured to the shaft 58 is a driving gear 68, and freely rotatable upon the shaft adjacent the said gear is an internally toothed gearing 69, with its teeth extending substantially in alinement with but remote from the driving teeth of the gear 68. Secured to the driving member 60 are pinions 70, which are adapted to mesh both with the driving gear 68 and with the gear 69. These pinions 70 are provided with housings 71, which extend over the gearings and secure them to the driving member, one at least of the housings being provided with an extending lug 72 (see Figs. 9, 10 and 11). Pivotally mounted on the gear 69 is a lever 73 one end of which is formed with a lateral projection 74, which extends through an opening in the gear 69, and is adapted to engage the lug 72 of one of the housings 71. The normal position of the lever is in engagement with the lug 72, and it is held in such engagement by means of a resilient member or spring 75 contained in a housing 76 in the face of the gear 69, and pressing against the opposite arm of the lever 73 to hold it in such engagement. To release the lever 73 from its engagement with the lug 72 the lever 65 which is secured to the shaft 63 is provided with a projection 77, and this projection is adapted to engage in a notch 78 in the arm of the lever 73 opposite the projection 74. When the lever 65 is turned downwardly, the knob 77 engages in the notch 78, raises the lever from its engagement with the lug 72, whereby the gear will be locked against rotation upon the shaft 58.

To form a driving connection for the shaft 58 a drive pulley 79 is freely mounted to rotate upon the shaft. This driving pulley is preferably formed with a surface for belt drive and the under face 80 of the pulley is formed at a slight inclination. A clutching member 81 is mounted slidably on the hub 81', which is keyed upon the shaft 58, the clutching member being provided with a circumferential groove 82. The outer face of the driving member is preferably formed at an inclination substantially the same as the inclination of the inner face of the driving pulley 79, so that the clutching member 81 may be moved into engagement with the inner face of the driving pulley. If desired the face of the member 81 may be provided with a yielding member 83, through which the members 79 and 81 may be connected and to prevent wearing thereof. To operate the clutch a lever 84 is pivotally mounted upon some suitable part of the frame or supporting structure for the drum, and operating mechanism and is provided with a bifurcated extremity or extension on both sides of the hub of the clutching member 81 or projections 85 which enter the groove 82. The movement of the lever 84 about its point of pivotal support is effective to engage or disengage the clutching member 81 from the drive pulley 79 and thus to complete a driving connection between the shaft and the drive pulley 79.

Extending over the gear 62 and the drive pinion 64 is a shield 86, which may be formed integral with the shield 48 which extends over the gear 52. Pivotally mounted upon this shield 86 is a dog 87 (see Fig. 1), which is adapted to extend through an opening in the shield, and when rotated about its point of pivotal support to engage the gear 62 to lock the driving member 60 against rotation, and thereby positioning the drum in any desired fixed position.

In operation the drum may be locked in any desired position to facilitate the insertion and removal of the parts or materials within the drum. When released from this engagement and with the door or closure 20 in position, the drum may be set in motion through the driving member 60, which engages the driving teeth 44, and through the planetary gearing or connections the driving member to the shaft 58. To drive the drum alone the planetary gearing comprising the gear 69, the driving gear 68 and the pinions 70, are locked together by means of the lever 73. To effect the movement of the butter working roller at the same time the drum is rotated, the gear 64 is moved into engagement with the gears 52 and 62 by means of the lever 65, whereby the butter working roller will be rotated simultaneously with the drum but in an opposite direction.

The conditions of operation in churning and in butter working are so different that it is usually desired to rotate the drum and the butter working roller at a reduced speed when the butter working operation is in progress, for the reason that in working the butter a solid is being dealt with, while in churning the cream a liquid is being agitated. To effect the rotation of the drum and the butter working roller at a reduced speed, the planetary gearing is provided, which reduces the speed of rotation of the drum and the roller without changing the speed of the driving shaft 58. To effect this operation the gearing 69 is locked in position by means of the lever 65, which engages the lever 73, releases the projection 74, and stops the gearing 69, whereupon the pinions 70 which engage with the driving gear 68 and with the teeth of the gearing 69 will be revolved about the gear 68 because of their engagement with the now fixed gear 69. This, of course, will result in a reduction of the speed of the driving member 60 dependent upon the relative size of the pinions and gearings, and in the present exemplification results in a reduction of speed substantially 4 to 1, as compared to the speed of this member when the planetary gearing is locked solid with the shaft. From this description it will be evident that the drum may be operated alone or it may be operated in connection with the butter working roller at the same speed, or the drum and the butter working roller may be operated at a reduced speed, the speed of rotation of the driving shaft 58 remaining the same.

While I have thus described the preferred embodiment of my invention, it is evident that others skilled in the arts to which this appertains may make various changes in the construction, combination and arrangement of the several parts without departing from the spirit and scope of the invention.

What I claim is:

1. In a butter making machine, the combination with a rotatable drum, agitating shelves, each comprising end pieces with slats secured thereto and spaced apart, and a butter working roller positioned at one edge of the shelf, the other edge of the shelves abutting the inner surface of the drum.

2. In a butter making machine, the combination with a rotatable drum, of a butter working roller, and agitating shelves each comprising end pieces with slats secured thereto and spaced apart, and a butter working roller positioned at one edge of the shelf, the other edge of the shelves abutting the inner surface of the drum, the said butter working rollers being all disposed substantially in the same plane with the shelves substantially at right angles thereto.

3. In a butter making machine, the combination with a rotatable drum having an opening in the outer surface thereof, a closure for the opening, a shelf bracket disposed with one end adjacent one side of the said opening with a rounded depression therein, a shelf adapted to be supported by said shelf bracket with the inner end seated in the rounded depression, and means to secure the other end of the shelf in contact with the said bracket, the said means being releasable and the shelf being removable when the said closure is removed.

4. In a butter making machine, the combination with a rotatable drum having an opening in the outer surface thereof, a closure for the opening, a shelf disposed with one end adjacent the inner surface of the drum and remote from the said opening, a shelf positioned upon the bracket, an abutment secured to the drum adjacent the edge of the shelf in contact therewith to hold that end of the shelf in place, and means to secure the shelf to the bracket at the other edge thereof, the said shelf being removable through the said opening.

5. In a butter making machine, the combination with a rotatable drum, of a butter working roller, a shaft secured to the roller through one end of the drum, a chambered member secured to the roller and with the chamber surrounding the shaft, packing material disposed in the chamber, and a member secured to the drum projecting through the end thereof and into the chamber against the packing to prevent leaking about the shaft.

6. In a butter making machine, the combination with a rotatable drum, of a shaft secured thereto, packing disposed about the shaft, and continuously acting spring pressed means to exert a constant pressure upon the packing.

7. In a butter making machine, the combination with a rotatable drum, of a shaft secured thereto, packing disposed about the shaft within the drum, a member secured to the drum and bearing against the packing, resilient means disposed about the shaft to press it and the said member outwardly and operative thereby continuously to compress the packing in the drum with a uniform pressure.

8. In a butter making machine, the combination with a rotatable drum, of a shaft secured thereto, packing disposed about the shaft within the drum, a member secured to the drum and bearing against the packing, means to adjust the position of the roller within the drum from one end, and means without the drum at the other end to compress packing at the same end of the drum with a uniform pressure.

9. In a machine of the class described, the combination with a drum, of a butter working roller mounted upon the same axis, means to drive the drum and the roller at certain speeds, and planetary gearing to drive them at different speeds.

10. In a machine of the class described, the combination with a drum, of a butter working roller mounted upon the same axis, a shaft and gears connected thereto operative to rotate the drum and roller at predetermined speeds, and planetary gearing in connection with the said shaft operative to reduce the speed of rotation of the drum and the roller, the speed of rotation of the shaft remaining the same.

11. In a machine of the class described, the combination with a drum, of a butter working roller mounted upon the same axis, a driving shaft, gearing to rotate the drum and the roller mounted upon the shaft, planetary gearing mounted upon the shaft, means to connect the first named gearing to the shaft to rotate the drum and the roller at different speeds, and means to connect the planetary gearing to the shaft to rotate the drum and the roller at a decreased speed, the speed of the driving shaft remaining the same.

12. In a machine of the class described, the combination with a drum, of a butter working roller mounted upon the same axis, a driving shaft, gearing to rotate the drum and the roller mounted upon the shaft, planetary gearing mounted upon the shaft, means to connect the first named gearing to the shaft to rotate the drum and the roller at different speeds, and means to connect the planetary gearing to the shaft, and through the first mentioned gearing, to rotate the drum and the roller at a decreased speed, the speed of the driving shaft remaining the same.

13. In a machine of the class described, the combination with a rotatable drum, of a roller, a driving shaft, a double geared driving member freely mounted upon the shaft, having means to engage both the drum and the roller, and means to connect the said member to the driving shaft.

14. In a machine of the class described, the combination with a rotatable drum, of a roller, a driving shaft, a driving member freely mounted upon the shaft, having separate driving portions, one operative to rotate the drum and a second driving portion adjacent the shaft of the roller, means operatively to connect the said driving portion and the roller shaft, and means to operate the driving shaft.

15. In a machine of the class described, the combination with a rotatable drum, of a roller, a driving shaft, a driving member mounted upon the shaft, having separate driving portions, one operative to rotate the drum and a second driving portion adjacent the shaft of the roller, means operatively to connect the said driving portion and the roller shaft, and planetary gearing mounted on the driving shaft and having means for engagement with the said driving member mounted upon the shaft.

16. In a machine of the class described, the combination with a rotatable drum, of a roller, a driving shaft, a driving member mounted upon the shaft, the said member being operative to drive both the roller and the drum, planetary gearing mounted on the driving shaft, and means operatively to connect the said member to the driving shaft through the planetary gearing.

17. In a machine of the class described, the combination with a rotatable drum, of a roller, a driving shaft, a driving member mounted upon the shaft, the said member being operative to drive both the roller and the drum, planetary gearing mounted on the driving shaft, and means operatively to connect the said member to the driving shaft through the planetary gearing, and to disconnect it from the driving shaft.

18. In a machine of the class described, the combination with a rotatable drum, of a roller, a driving shaft, a driving member mounted upon the shaft, the said member being operative to drive both the roller and the drum, planetary gearing mounted on the driving shaft, and means to connect the planetary gearing and the driving member to rotate at the same speed as the driving shaft.

19. In a machine of the class described, the combination with a rotatable drum, of a roller mounted on the same axis, the shaft of the roller extending through and beyond the bearing support of the drum, driving gears secured to the drum and to the roller shaft, a driving shaft, a driving member rotatable on the driving shaft, one portion of which meshes with the gear on the drum, an idle gear movable longitudinally into engagement with another portion of the driving member and the roller gear, and means to rotate the said driving member, whereby the drum and roller are rotated in opposite directions.

20. In a machine of the class described, the combination with a rotatable drum, of a roller disposed in the drum, a driving shaft, a driving member freely mounted on the shaft, means to connect the said member with the drum and the roller, a driving gear secured to the shaft, driving pinions mounted on the said member and meshing with the gear, and means to lock the pinions to the gear to rotate the driving member at the speed of the driving shaft.

21. In a machine of the class described, the combination with a rotatable drum, of a roller disposed in the drum, a driving shaft, a driving member freely mounted on the shaft, means to connect the said member with the drum and the roller, a driving gear secured to the shaft, driving pinions mounted on the said member and meshing with the gear, and means to revolve the pinions about the said gear as it rotates to effect the rotation of the driving member at a speed less than that of the shaft.

22. In a machine of the class described, having a rotatable drum and roller, of a driving shaft, a driving member freely mounted on the shaft, means to connect the member with the drum and the roller, planetary gearing interposed between the driving shaft and the driving member, and means operative to connect the shaft and the member through the said gearing to drive the member at the same speed as the shaft, and at reduced speed in the same direction.

23. In a machine of the class described, having a rotatable drum and roller, of a driving shaft, a driving member freely mounted on the shaft, means to connect the member with the drum and the roller, a gear secured to the shaft, and planetary gearing comprising a pinion rotatably mounted on the driving member and meshing with the gear on the shaft, and an internal gear meshing with the said pinion.

24. In a machine of the class described, having a rotatable drum and roller, of a driving shaft, a driving member freely mounted on the shaft, means to connect the member with the drum and the roller, a gear secured to the shaft, and planetary gearing comprising a pinion rotatably mounted on the driving member and meshing with the gear on the shaft, an internal gear freely mounted on the driving shaft and meshing with the pinion, and means to lock the internal gear from rotating with the shaft.

25. In a machine of the class described, having a rotatable drum and roller, of a driving shaft, a driving member freely mounted on the shaft, means to connect the member with the drum and the roller, a gear secured to the shaft, and planetary gearing comprising a pinion rotatably mounted on the driving member and meshing with the gear on the shaft, an internal gear freely mounted on the driving shaft and meshing with the pinion, and means to lock the internal gear to rotate with the pinion, and with the gear secured to the shaft.

26. In a machine of the class described, having a rotatable drum and roller, of a driving shaft, a driving member freely mounted on the shaft, means to connect the member with the drum and the roller, a gear secured to the shaft, and planetary gearing comprising a pinion rotatably mounted on the driving member and meshing with the gear on the shaft, an internal gear freely mounted on the driving shaft and meshing with the pinion, and a spring pressed lever pivotally mounted on the internal gear and effective to engage the driving member when the shaft is rotated.

27. In a machine of the class described, having a rotatable drum and roller, of a driving shaft, a driving member freely mounted on the shaft, means to connect the member with the drum and the roller, a gear secured to the shaft, and planetary gearing comprising a pinion rotatably mounted on the driving member and meshing with the gear on the shaft, an internal gear freely mounted on the driving shaft and meshing with the pinion, and a spring pressed lever pivotally mounted on the internal gear and having a projection extending through the gear to engage the said driving member, the said shaft and driving member being locked together when the lever is in such position.

28. In a machine of the class described, the combination with a rotatable drum, of a roller mounted on the same axis and having a shaft extending beyond the drum mounting, a driving shaft, a driving member mounted on the driving shaft and having a driving gear, a gear secured to the roller shaft and substantially in line with the said driving gear, an idler gear movable into engagement with the two gears to drive the roller, and a shield extending substantially over the said gears and around them on one side.

29. In a machine of the class described, the combination with a rotatable drum, of a roller mounted on the same axis and having a shaft extending beyond the drum mounting, a driving shaft, a driving member mounted on the driving shaft, and having a driving gear, a gear secured to the roller shaft and substantially in line with the said driving gear, an idler gear movable into engagement with the two gears to drive the roller, a shield extending substantially over the said gears and around them on one side, a dog pivotally mounted in the shield and movable to engage the said driving gear whereby the drum may be stopped and locked in any desired position.

30. In a machine of the class described, the combination with a rotatable drum, of a roller mounted on the same axis and having a shaft extending beyond the drum mounting, a driving shaft, a driving member mounted on the driving shaft and having a driving gear, a gear secured to the roller shaft and substantially in line with the driving gear, an idler gear longitudinally movable into and out of engagement with the alined gears, a notched shield positioned about the idler gear, and a lever secured to the idler gear shaft and operative to move the gear longitudinally and to be positioned in the notches of said shield.

31. In a machine of the class described, the combination with a rotatable drum, of a roller mounted on the same axis and having a shaft extending beyond the drum mounting, a driving shaft, a driving member mounted on the driving shaft and having a driving gear, a gear secured to the roller shaft and substantially in line with the driving gear, an idler gear longitudinally movable into and out of engagement with the alined gears, a notched shield positioned about the idler gear, planetary gearing comprising an internally toothed gear mounted upon the driving shaft and pinions mounted on the adjacent face of the driving member and meshing with the internal gear, a spring pressed lever pivoted on the said gear and having a projection on one arm extending through the gear to engage the driving member, and a lever secured to the said idler gear shaft and having a projection to engage the other arm of said pivoted lever whereby the lever will be released from its engagement and stopped, and means to engage the pinions with the shaft.

32. In a machine of the class described, the combination with a rotatable drum, of a roller disposed therein and mounted on the same axis with a driving shaft extending beyond the bearing for the drum at one end, a driving shaft, a driving member mounted on the shaft having separate gear portions, one of said portions being operative to rotate the drum, a gear mounted on the roller shaft substantially in line with the other driving gear portion, an idler gear, a lever to move the idler gear to mesh with both of said alined gears, a gear free to rotate on the driving shaft, a driving gear secured to the driving shaft, pinions mounted on the driving member and meshing with the two last named gears, a spring pressed lever secured to the gear free to rotate on the driving shaft and having one end normally extending through it to engage the driving member, all the members on the driving shaft being locked to rotate with the shaft when the lever is in this position, the other end of the lever being formed with a notch, and the idler gear lever being formed with a knot to engage in the notch when the lever is turned down, thereby releasing the notched lever from engagement with the driving member and locking the gear to which it is secured from rotating about the driving shaft.

33. In a machine of the class described, the combination with a rotatable drum, of a roller rotatably mounted therein, a driving shaft, a driving member freely rotatable on the shaft, means to connect it to the drum and roller, planetary gearing comprising a gear rotatable on the driving shaft, a driving gear fixed to the shaft, and pinions mounted on the driving member meshing with the two last named gears, means to engage the gear rotatable on the shaft with the driving member, whereby the rotation of the shaft will be imparted directly to the driving member, and means to release the said gear from such engagement and to lock it against rotation with the shaft whereby the said pinions will engage the said two gears and will be revolved about the gear secured to the shaft to produce rotation of the driving member at a reduced speed.

34. In a machine of the class described, the combination with a rotatable drum, of a roller rotatably mounted therein, a driving shaft, a driving member freely rotatable on the shaft, means operatively to connect the driving member to the drum and the roller, means operatively to connect the driving member to the driving shaft, and a clutching device comprising a pulley freely rotatable on the shaft having an outwardly inclined inner face, a clutching member slidably keyed to the shaft and having an outer face inclined substantially the same as said pulley surface and of a diameter to be inserted therein, the hub of the said member being provided with a circumferential groove, and a lever pivotally mounted on the machine frame and having a bifurcated extremity with projections which enter and engage the groove, the said lever being movable and operative to apply the clutch member to the inner face of the pulley.

35. In a butter working machine, the combination with a rotatable drum, of a plurality of butter working rollers disposed in the same plane, and shelves disposed at right angles to the said plane opposite the outer rollers and ahead of the rollers with respect to the rotary movement of the drum.

In testimony whereof I have signed my name to this specification, in the presence of two subscribing witnesses, on this 11th day of November A. D. 1911.

PAUL HANSON.

Witnesses:
CARL K. BENNETT,
RACHEL C. PETERS.